United States Patent [19]

Hoshina et al.

[11] Patent Number: 4,659,644

[45] Date of Patent: Apr. 21, 1987

[54] DIAZO-TYPE THERMOSENSITIVE RECORDING MATERIAL WITH HYDRAZONE COUPLER AND CHELATING METAL COMPOUND

[75] Inventors: Takayuki Hoshina, Fuji; Michihisa Takahashi, Tachikawa; Masanori Rimoto, Mishima; Masanaka Nagamoto, Shizuoka, all of Japan

[73] Assignee: Ricoh Company, Ltd., Tokyo, Japan

[21] Appl. No.: 683,513

[22] Filed: Dec. 19, 1984

[30] Foreign Application Priority Data

Dec. 22, 1983 [JP] Japan ............................... 58-242979

[51] Int. Cl.⁴ ....................... G03C 1/58; G01D 15/10; B41M 5/18

[52] U.S. Cl. .................................... 430/182; 430/151; 430/176; 430/178; 430/179; 430/340; 430/341; 430/343; 430/346; 346/210; 346/211; 346/212; 346/218

[58] Field of Search ............... 430/182, 178, 179, 176, 430/151, 346, 340, 341, 343; 346/210, 211, 212, 218

[56] References Cited

U.S. PATENT DOCUMENTS

| | | | |
|---|---|---|---|
| 2,551,133 | 5/1951 | Jennings et al. | 430/178 |
| 3,129,101 | 4/1964 | Workman | 430/170 |
| 3,146,348 | 8/1964 | Workman | 430/182 |
| 3,390,995 | 7/1968 | Manos | 430/340 |
| 3,390,996 | 7/1968 | MacLachlan | 430/340 |
| 3,539,345 | 11/1970 | Welch | 430/178 |
| 3,615,533 | 10/1971 | Rauner et al. | 430/346 |
| 3,676,132 | 7/1972 | Scheler et al. | 430/346 |
| 3,695,885 | 10/1972 | Margama et al. | 430/178 |
| 4,334,015 | 6/1982 | Yarian | 346/211 |
| 4,400,456 | 8/1983 | Matsuda et al. | 430/179 |
| 4,411,979 | 10/1983 | Nagamoto et al. | 430/178 |

FOREIGN PATENT DOCUMENTS

| | | | |
|---|---|---|---|
| 54-35723 | 3/1979 | Japan | 430/171 |
| 54-35724 | 3/1979 | Japan | 430/171 |
| 59-160136 | 9/1984 | Japan | 430/179 |

*Primary Examiner*—Charles L. Bowers, Jr.
*Attorney, Agent, or Firm*—Oblon, Fisher, Spivak, McClelland & Maier

[57] ABSTRACT

A diazo-type thermosensitive recording material is disclosed, which comprises a support material and a thermosensitive coloring layer formed on the support material, which thermosensitive coloring layer comprises a diazonium compound, a coupler and a thermo-fusible or thermo-softening material, the coupler being a combination of a hydrazone-type coupler of the formula of $R^1$—NH—N═CH—$R^2$ (wherein $R^1$ and $R^2$ are defined in detail in the specification) and a two-valence metal compound capable of chelating with the coupled product produced by the coupling of the diazonium compound and the hydrazone-type coupler.

10 Claims, No Drawings

DIAZO-TYPE THERMOSENSITIVE RECORDING MATERIAL WITH HYDRAZONE COUPLER AND CHELATING METAL COMPOUND

BACKGROUND OF THE INVENTION

The present invention relates to a diazo-type thermosensitive recording material, and more particularly to an improved diazo-type thermosensitive recording material capable of maintaining the integrity of the recorded images without fading.

Thermosensitive recording materials are conventionally used not only as copying sheets for copying books and documents, but also as output recording sheets for use with computers, facsimile apparatus and medical analytical instruments, and for thermosensitive recording type magnetic tickets and thermosensitive recording type labels.

Furthermore, it is considered that thermosensitive recording can also be used for securities, merchandise coupons, entrance tickets, certificates, payment slips and the like by utilizing the property of easy automatic recording. However, thermosensitive recording materials for such uses must be image-fixable in order to maintain the integrity of the recorded images.

Conventionally, as image-fixable thermosensitive recording material, diazo-type thermosensitive recording material are known, which utilize the coloring reaction between a diazonium compound and a coupler. However, with respect to the fading of recording images, the conventional diazo-type thermosensitive recording materials have not yet been sufficiently improved for practical use.

SUMMARY OF THE INVENTION

It is therefore an object of the present invention to provide an improved diazo-type thermosensitive recording material which is capable of maintaining the integrity of the recorded images without fading.

According to the present invention, the above object is attained by a diazo-type thermosensitive recording material comprising a support material and a thermosensitive coloring layer formed on the support material, which thermosensitive coloring layer comprises a diazonium compound, a coupler and a thermo-fusible material, in which, as the coupler, a combination of a hydrazone-type coupler of the following formula and a two-valence metal compound capable of chelating with the coupled product produced by the coupling of the diazonium compound and the coupler is employed:

$R^1$—NH—N=CH—$R^2$ wherein $R^1$ represents 2-pyridyl, phenyl or 2-benzothiazolyl, and $R^2$ represents one of the following:

(1) —$COOR^3$, —$R^4$—$COOR^5$, wherein $R^3$ and $R^5$ each represents hydrogen or lower alkyl having 1 to 6 carbon atoms, and $R^4$ represents lower alkylene having 1 to 5 carbon atoms, (2) 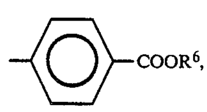

wherein $R^6$ represents hydrogen or lower alkyl having 1 to 6 carbon atoms, (3) 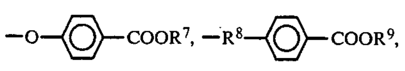

wherein $R^7$ and $R^9$ each represent hydrogen or lower alkyl having 1 to 6 carbon atoms, and $R^8$ represents lower alkylene having 1 to 6 carbon atoms, (4) 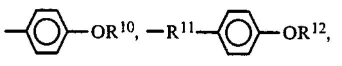

wherein $R^{10}$ and $R^{12}$ each represent hydrogen or lower alkyl having 1 to 6 carbon atoms, and $R^{11}$ represents lower alkylene having 1 to 5 carbon atoms, (5) —$COR^{13}$, wherein $R^{13}$ represents lower alkyl having 1 to 6 carbon atoms or phenyl, and (6) —$OR^{14}$, —$R^{15}$—O—$R^{16}$, wherein $R^{14}$ and $R^{16}$ each represent hydrogen, lower alkyl having 1 to 6 carbon atoms, or phenyl, and $R^{15}$ represents lower alkylene having 1 to 6 carbon atoms.

DETAILED DESCRIPTION OF THE PREFERRED EMBODIMENTS

The diazo-type thermosensitive recording material according to the present invention comprises a diazonium compound, a hydrozone-type coupler, a thermo-fusible material and a two-valence metal compound capable of chelating with the coupled product produced by the coupling of the diazonium compound and the hydrazone-type coupler. These components are contained in one or two or more layers supported on a support material.

Specific examples of the hydrazone type couplers for use in the present invention are as follows:

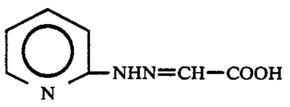
(1)

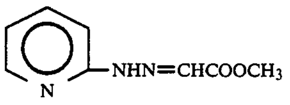
(2)

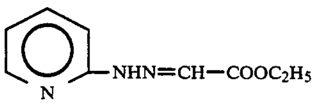
(3)

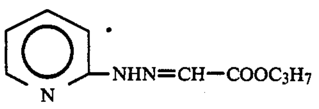
(4)

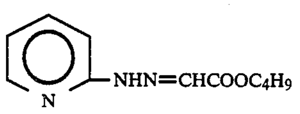
(5)

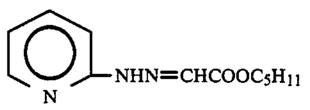
(6)

-continued
(7)
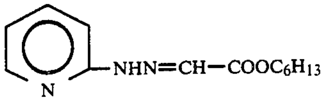
(8)
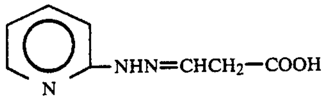
(9)
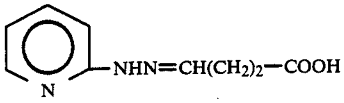
(10)
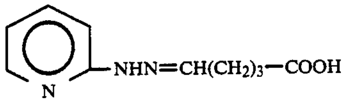
(11)
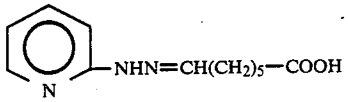
(12)
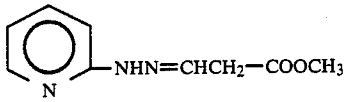
(13)
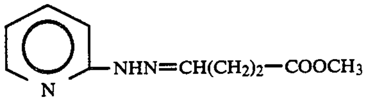
(14)
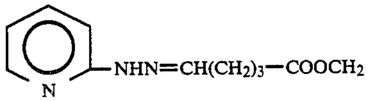
(15)
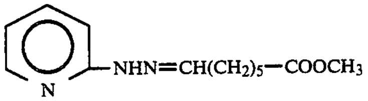
(16)
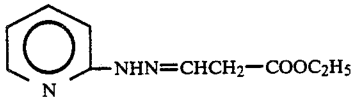
(17)
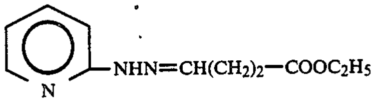
(18)
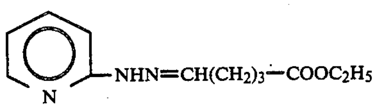
(19)
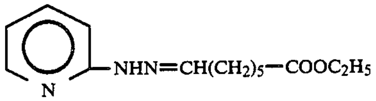
-continued
(20)
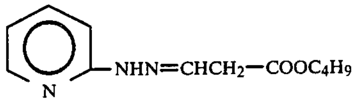
(21)
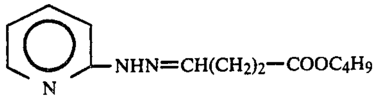
(22)
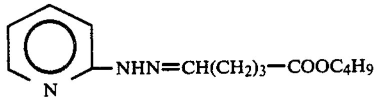
(23)
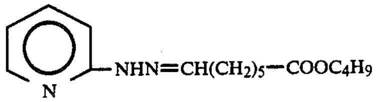
(24)
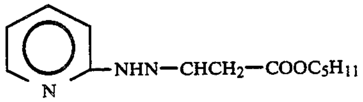
(25)
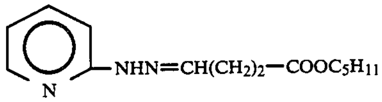
(26)
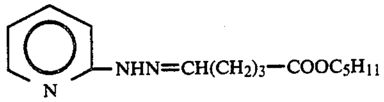
(27)
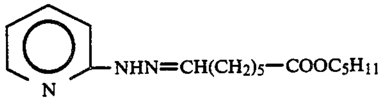
(28)
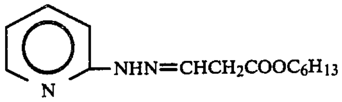
(29)
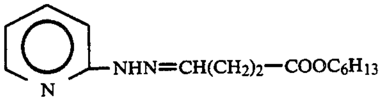
(30)
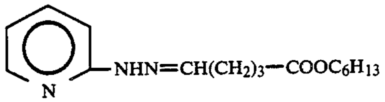
(31)
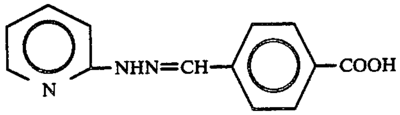
(32)
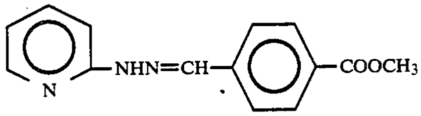

-continued
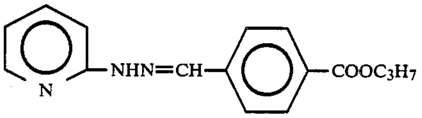
(33)
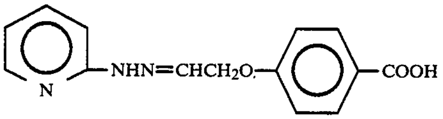
(34)
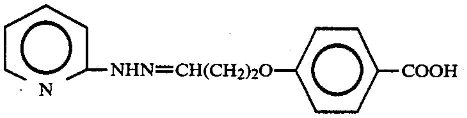
(35)
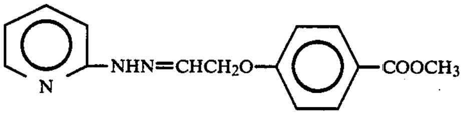
(36)
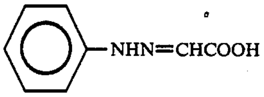
(37)
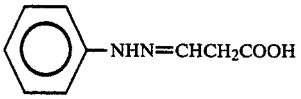
(38)
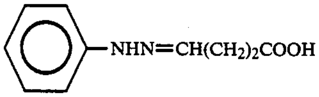
(39)
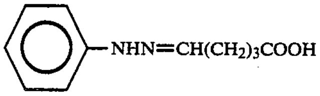
(40)
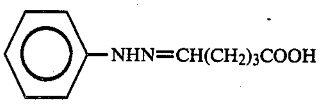
(41)
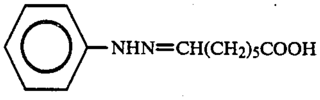
(42)
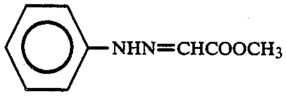
(43)
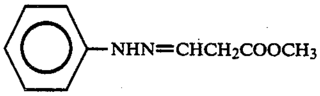
(44)
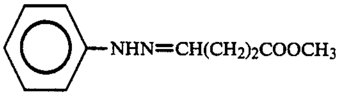
(45)
-continued
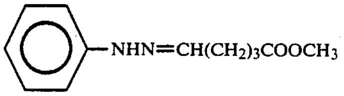
(46)
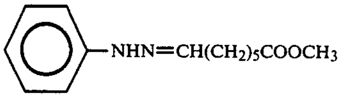
(47)
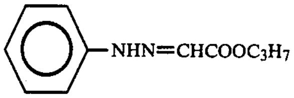
(48)
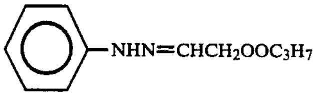
(49)
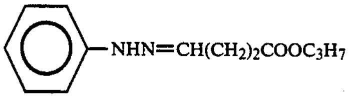
(50)
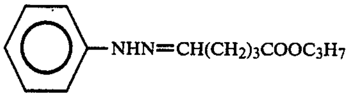
(51)
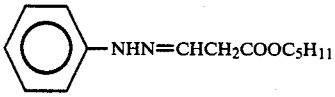
(52)
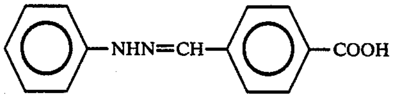
(53)
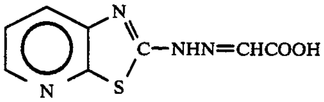
(54)
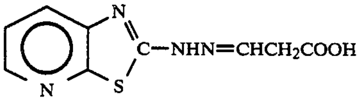
(55)
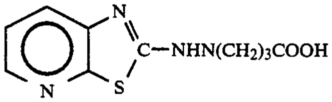
(56)
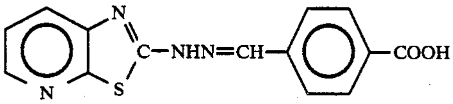
(57)
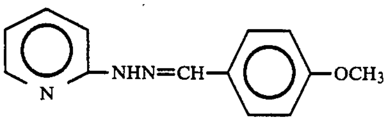
(58)

-continued (59)

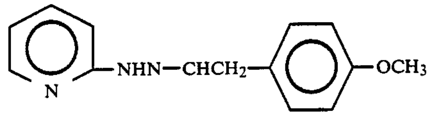

(60)

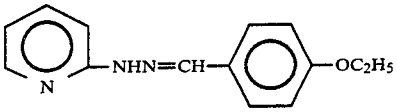

(61)

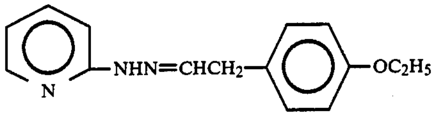

(62)

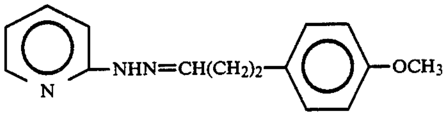

(63)

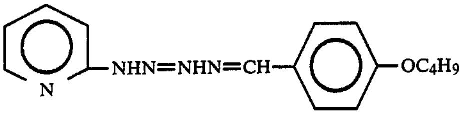

(64)

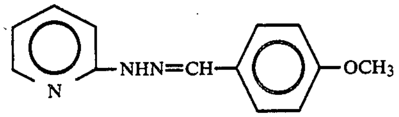

(65)

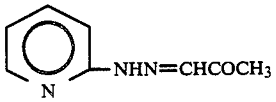

(66)

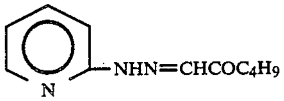

(67)

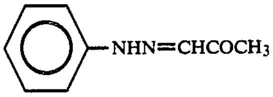

(68)

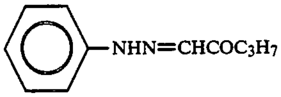

(69)

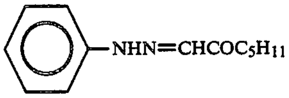

(70)

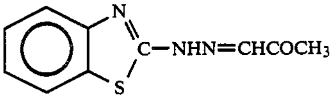

-continued (71)

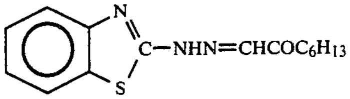

(72)

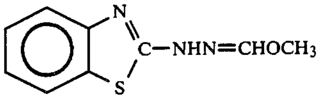

(73)

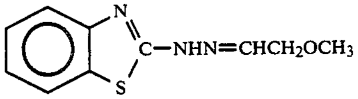

(74)

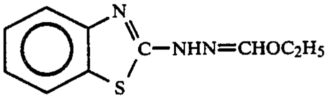

(75)

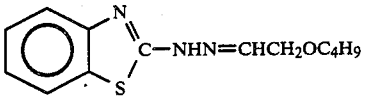

(76)

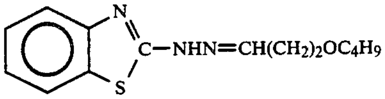

(77)

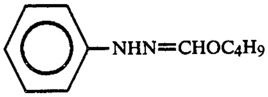

(78)

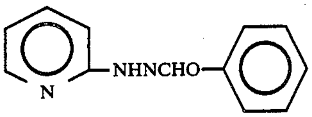

(79)

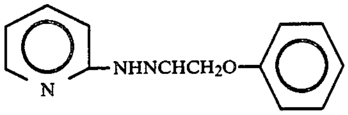

(80)

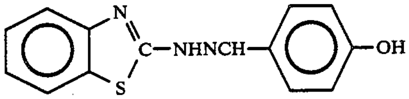

(81)

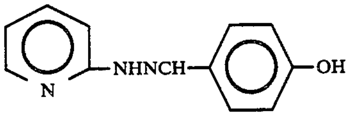

As the two-valence metal compounds capable of chelating with the coupled products formed by the coupling of the diazonium compound and the above-mentioned couplers are compounds of the transition metals nickel, zinc, cobalt, copper, manganese, europium, iron, silver, cadmium, chromium, titanium, molybdenum, tungsten, germanium, palladium, and mercury.

Specific examples of the nickel compounds are nickel benzenesulfonate, nickel acetate ($4H_2O$), nickel(II) acetoacetate, ammonium nickel chloride, ammonium nickel sulfate, nickel benzoate, nickel bromide, nickel carbonate (basic), nickel chloride, nickel citrate, nickel (II) 4-cyclohexylbutyrate, nickel hypophosphite, nickel formate, nickel hydroxide, nickelous iodide, nickel nitrate, nickelocene, nickel oleate, nickel oxalate, nickel phosphate, nickel phthalocyanine, potassium tricyanoniccolate, potassium nickel sulfate, nickel selenate ($6H_2O$), nickel stearate, nickel sulfamate, nickel sulfate ($7H_2O$), nickel sulfate ($6H_2O$), nickel tartrate and nickel thiocyanate.

With respect to other metal compounds, similar compounds can be used in the present invention.

It is preferable that such a two-valence metal compound be employed in an amount ranging from 0.5 moles to 10 moles to 1 mole of the coupled product.

In the present invention, the coupled product (a formazan dye), which is produced by the coupling of the diazonium compound and the hydrazone-type coupler, forms a chelate dye by chelating with the two-valence transition metal compound. The thus obtained dye is an excellent dye which does not fade in the present invention. Generally, the color tone of such chelated formazan dyes changes with the pH of the system in which the chelated formazan dyes are present. Therefore, when such chelated formazan dyes are used in a development method utilizing ammonia or an alkaline solution, the color tone of the chelated formazan dyes is apt to change with time. However, in the present invention, since the chelated formazan dyes are employed as a component of the thermosensitive recording material, the pH of the system in which the chelated formazan dyes are present does not substantially change. As a result, the color tone of the chelated formazan dyes advantageously does not change when employed in the present invention.

The thermosensitive recording material according to the present invention is prepared by forming a thermosensitive coloring layer containing the above-mentioned components on a support material, such as paper, synthetic paper, a plastic film or a support material which is coated with a synthetic resin and/or a filler.

As the diazonium compounds for use in the present invention, those employed in conventional diazo photosensitive paper can be employed. Examples of such diazonium compounds are as follows:

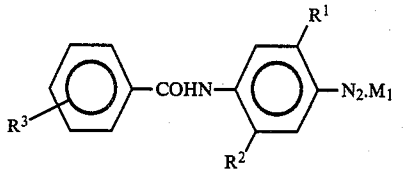

[I]

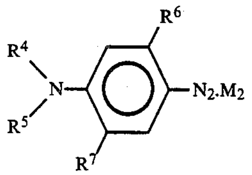

[II]

-continued

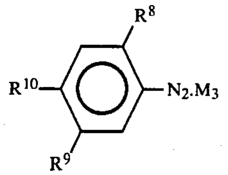

[III]

In the above formulas [I], [II] and [III], $R^1$, $R^6$ and $R^8$ each represent hydrogen, halogen, lower alkyl or alkoxy having 1 to 5 carbon atoms,

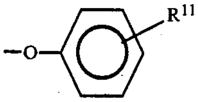

or

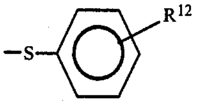

(wherein $R^{11}$ and $R^{12}$ each are the same as $R^2$); $R^2$, $R^3$ and $R^9$ each represent hydrogen, halogen, lower alkyl or alkoxy having 1 to 5 carbon atoms; $R^4$ and $R^5$ each represent lower alkyl having 1 to 5 carbon atoms, hydroxy alkyl or

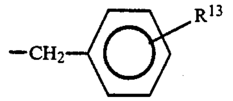

(wherein $R^{13}$ represents hydrogen, alkyl having 1 to 3 carbon atoms, or halogen); $R^7$ represents hydrogen, halogen, trifluoromethyl, alkyl or alkoxy having 1 to 5 carbon atoms, or

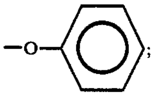

and $R^{10}$ represents

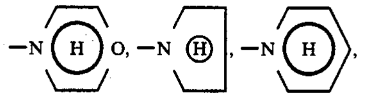

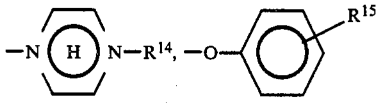

or

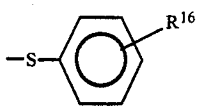

(wherein $R^{14}$, $R^{15}$ and $R^{16}$ each are the same as $R^{13}$); and $M^1$, $M^2$ and $M^3$ each represent an acid residue or an acid residue which forms a double salt in combination with a metal salt. As the acid residue, fluorine-containing inorganic acid ions, such as $BF_4^-$ and $PF_6^-$, are preferable for use, and as the metal salts which form double salts in combination with the acid residues, for instance, $ZnCl_2$, $CdCl_2$ and $SnCl_2$ are preferable.

Specific examples of the diazonium compounds having the formula [I] are as follows:

(1) 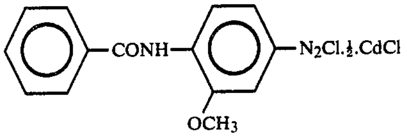

(2) 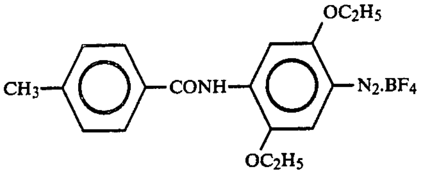

(3) 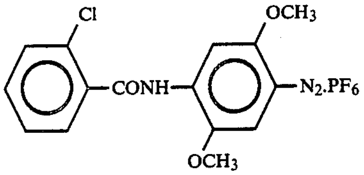

Specific examples of the diazonium compounds having the formula [II] are as follows:

(1) 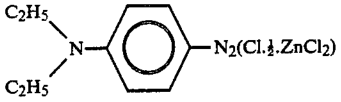

(2) 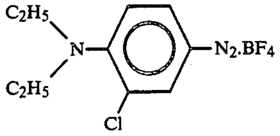

(3) 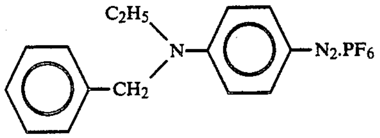

(4) 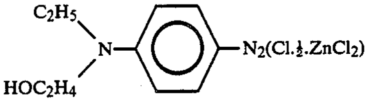

(5) 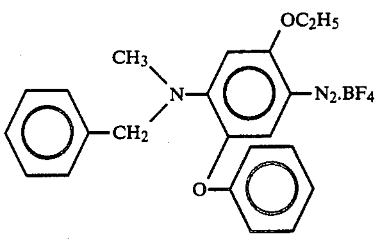

Specific examples of the diazonium compounds having the formula [III] are as follows:

(1) 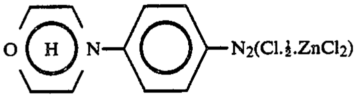

-continued (2) 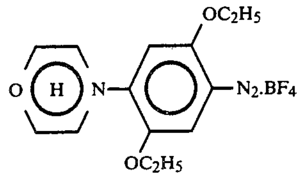

(3) 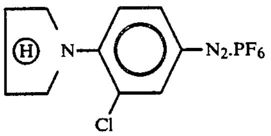

(4) 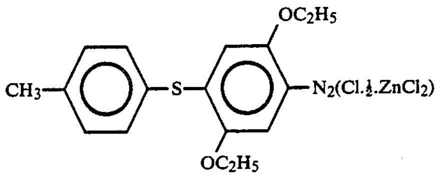

(5) 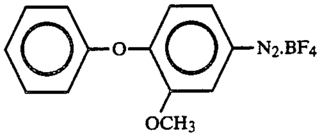

In the present invention, in order to obtain thermosensitive recording materials which are further improved as to preservability and which can be stored for a prolonged period of time, it is preferable to use the diazonium compounds in a water-insoluble form, for instance, in the form of fluorine-containing salts, such as salts of $HBF_4$ and $HPF_6$.

In the present invention, in order to enhance the coloring speed of the recording material so as to make it suitable for high speed recording, it is preferable to use thermo-fusible or thermo-softening materials in the diazonium compound layer and/or coupler layer of the recording material.

For attaining high speed coloring with high image density, it is preferable that the thermo-fusible or thermo-softening materials for use in the present invention have a melting or softening point ranging from 50° C. to 250° C. When a thermo-fusible or thermo-softening material having a melting or softening point below 50° C. is employed, the preservability of the thermosensitive recording material becomes poor, while when a thermo-fusible material having a melting or softening point above 250° C. is employed, the thermal response of the thermosensitive recording material to a thermal head becomes insufficient for practical use.

In order to attain high speed coloring, it is preferable that the thermo-fusible or thermo-softening material be employed in an amount of 2 to 30 parts by weight, more preferably in an amount of 5 to 10 parts by weight, to 1 part by weight of the diazonium compound. When the amount of the thermo-fusible or thermo-softening material is less than 2 parts by weight to 1 part by weight of the diazonium compound, the coloring performance of the thermosensitive recording material becomes insufficient and unsuitable for high speed recording. Therefore, for high speed recording, for instance, in facsimile apparatus, it is more preferable to use the thermo-fusible or thermo-softening material in an amount of 5 parts by weight or more to 1 part by weight of the diazonium compound.

On the other hand, when the amount of the thermo-fusible or thermo-softening material is excessive, that is, more than 30 parts by weight to 1 part by weight of the diazonium compound, the recorded images tend to spread at the time of image formation by application of heat, so that clear-cut images cannot be obtained. Therefore, in the present invention, it is preferable to use the thermo-fusible or thermo-softening materials in the above-mentioned range.

In the present invention, the thermo-fusible or thermo-softening materials can be used in an independent layer in the thermosensitive recording material.

Specific examples of such thermo-fusible or thermo-softening materials for use in the present invention are as follows: alcohol derivatives such as 2,2,2-tribromoethanol, 2,2-dimethyl-trimethylene glycol and cyclohexane-1,2-diol; acid derivatives such as malonic acid, glutaric acid, maleic acid, and methylmaleic acid; animal waxes such as bees wax and shellac wax; plant waxes such as carnauba wax; mineral waxes such as montan wax; petroleum waxes such as paraffin wax and microcrystalline wax; and other synthetic waxes such as polyhydric alcohol esters of higher fatty acids, higher fatty amines, higher fatty amides, condensates of fatty acids and amines, condensates of aromatic acids and amines, synthetic paraffins, chlorinated paraffin, higher straight-chain glycols, dialkyl-3,4-epoxyhexahydrophthalate, polyvinyl acetate, polyvinyl chloride, vinyl chloride-vinyl acetate copolymer, polyacrylic acid ester, polystyrene, polybutadiene, polyacrylamide, and styrene/butadiene/acryl type copolymer.

Furthermore, in the present invention, when necessary, auxiliary agents, such as acidic materials, basic materials, fillers, binder agents, can be added to the thermosensitive coloring layer.

Acidic materials are for preventing a coupling reaction and for giving better preservability. Examples of such acidic materials are tartaric acid, citric acid, boric acid, lactic acid, gluconic acid and sulfuric acid.

Basic materials are for promoting a coupling reaction upon application of heat. Examples of such basic materials are caustic alkali and alkali carbonates such as sodium hydroxide, calcium hydroxide and potassium carbonate, and materials which become basic when heated, such as urea and thiourea and their derivatives, alkali salts of trichloroacetic acid, ammonium chloride, ammonium sulfate and ammonium citrate.

In the present invention, fillers are for improving the capability of the thermosensitive coloring layer with a thermal head which applies heat to the coloring layer for image formation. The following are examples of such fillers: organic and inorganic materials such as microparticles of styrene resin, microparticles of urea-formaldehyde condensate resin, aluminum hydroxide, magnesium hydroxide, calcium carbonate, titanium, talc, kaoline, silica and aluminium.

Binder agents are for binding the above components of the thermosensitive recording materials to the support material.

Examples of such binder agents are (1) organic-solvent-soluble resins and water-dispersible resins, for example, polyester, polystyrene, chlorinated rubber, polyvinyl acetate, polyvinyl chloride, polybutadiene, polyacrylic acid ester, vinyl chloride/vinyl acetate copolymer, polybutadiene, styrene/butadiene/acryl copolymer, polyethylene, ethylene/vinyl acetate copolymer, styrene/acryl copolymer, polyvinylidene chloride, vinylidene chloride/acryl copolymer, phenol resin, urea/formaldehyde resin and melamine resin; and (2) water-soluble resins, for example, polyvinyl alcohol, polyacrylamide, casein, gelatin, starch and its derivatives, polyvinyl pyrrolidone, carboxymethylcellulose, methylcellulose, ethylcellulose, styrene/maleic anhydride copolymer, and iso(or di-iso)-butylene/maleic anhydride copolymer.

A thermosensitive recording material according to the present invention can be prepared by preparing a thermosensitive coloring layer formation liquid by dissolving or dispersing each of the above-mentioned components in an appropriate solvent, and then by coating on a support material, such as a sheet of paper or a film, the thermosensitive coloring layer formation liquid, followed by drying the coated layer to form a thermosensitive coloring layer on the support material.

The thermosensitive coloring layer formed on the support material can be made in the form of a single layer or multiple layers consisting of two or more layers.

When the thermosensitive coloring layer is made in the form of multiple layers, a variety of choices are possible in terms of the location of the above-mentioned components such as a diazonium compound, a coupler and a thermo-fusible or thermo-softening material in the multiple layers.

The multiple layers can be constructed, for example, in the forms of [D+S]/[C+X], [D]/[X]/[C], [C+X]/[D+X] and [C+X]/[X]/[D+X], wherein [D] represents a layer containing a diazonium compound; [C[, a layer containing a coupler; [X], a layer containing a thermo-fusible of thermo-softening material; [D+X], a layer containing a diazonium compound and a thermo-fusible or thermo-softening material; and [C+Y], a layer containing a coupler and a thermo-fusible or thermo-softening material.

As a matter of course, the above-mentioned layers can contain the previously described auxiliary agents, such as fillers, acidic materials and alkali materials. Furthermore, it is not always necessary that these auxiliary agents be contained together with any of the diazonium compound, coupler and thermo-fusible or thermo-softening material, but they can be contained in an independent layer such as an upper layer, lower layer or intermediate layer with respect to the layers containing the diazonium compound, coupler or thermo-fusible or thermo-softening material.

In the present invention, solvents for dissolving or dispersing the components of the layers are selected in accordance with the properties and objectives of each layer.

Examples of such solvents include: water and aqueous solvents such as a mixture of water and an organic solvent; non-polar organic solvents such as benzene, toluene, xylene, n-hexane, n-heptane, cyclohexane and kerosene; and polar organic solvents such as methyl isobutyl keton, methyl cellosolve, acetone, methyl ethyl ketone and dimethyl ether.

By referring to the following examples, the present invention will now be explained in detail. The present invention is, of course, not limited to these examples.

EXAMPLE 1

Preparation of Thermosensitive Coloring Layer Formation Liquid No. 1

| | Parts by Weight |
|---|---|
| 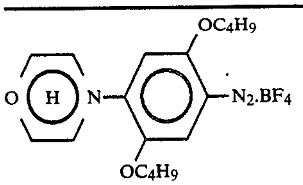 | 2 |
| 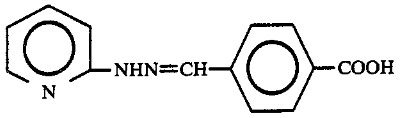 | 3 |
| Nickel chloride | 3 |
| Stearamide | 15 |
| Guanidine phosphate | 6 |
| Gluconic acid | 1 |
| Calcium carbonate | 3 |
| Cyclohexane | 48 |

Thermosensitive Coloring Layer Formation Liquid No. 1 was prepared by dispersing the above components in a ball mill for 12 hours, adding thereto 8 parts by weight of polyvinyl cinnamate, followed by mixing the mixture until it was uniformly mixed.

The thus prepared thermosensitive coloring layer formation liquid was applied to a sheet of high quality paper (having a basis weight of 50 g/$m^2$), so that a thermosensitive coloring layer was formed on the paper, with a deposition of 1.5 to 2.0 g/$m^2$ of the solid components when dried.

The thus prepared thermosensitive recording material was dried and was subjected to calendering, whereby a diazo-type thermosensitive recording material No. 1 according to the present invention was prepared.

The image density and fading of the images recorded on the diazo-type thermosensitive recording material No. 1 were measured.

For measurement of the image density, images were formed by a commercially available facsimile apparatus (RIFAX 303 made by Ricoh Company, Ltd.) in the G-II mode. The images were then fixed by complete exposure to light by use of a commercially available diazo copying machine (RICOPY High-Start Type 4 made by Ricoh Company, Ltd.)

The image density was determined to be 1.09 by a Macbeth densitometer (RD-514).

The background of the recording material was not colored any further by further application of heat thereto and the obtained images were not discolored even if they were brought into contact with organic solvents, such as toluene.

The obtained images were exposed to light by a commercially available fade meter (Suga Testing Apparatus Carbon Arc Fade Meter FA-III) for 24 houres and the fading of the images was assessed by measuring the image density after the exposure.

The result was that the image density was 1.00.

EXAMPLE 2

(1) Preparation of Diazonium Compound Dispersion D-1

| | Parts by Weight |
|---|---|
| 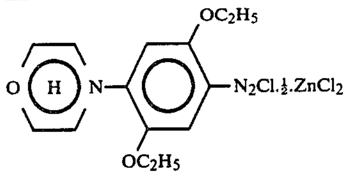 | 2 |
| N—octadecylcarbamoylbenzene | 10 |
| Acetamide | 4 |
| 10% aqueous solution of polyvinyl alcohol | 10 |
| Water | 74 |

The above components were dispersed in a ball mill for 24 hours, whereby Diazonium Compound Dispersion D-1 was prepared.

(2) Preparation of Coupler Dispersion C-1

| | Parts by Weight |
|---|---|
| 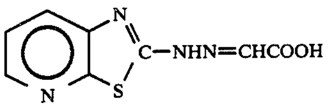 | 5 |
| Montan wax | 2 |
| Kaolin | 2 |
| Zinc chloride | 15 |
| Polyvinyl cinnamate | 2 |
| n-hexane | 74 |

The above components were dispersed in a ball mill for 24 hours, whereby Coupler Dispersion C-1 was prepared.

Diazonium Compound Dispersion D-1 was applied to a sheet of high quality paper (having a basis weight of 50 g/$m^2$) so as to form a diazonium compound layer with a deposition of 1.5 to 2.0 g/$m^2$ of the solid components thereof when dried.

After the diazonium compound layer was dried, Coupler Dispersion C-1 was applied to the diazonium compound layer so as to form a coupler layer with a deposition of 1.5 to 2.0 g/$m^2$ of the solid compounds thereof (when dried), and was then dried, whereby a diazo-type thermosensitive recording material was prepared. The recording material was then subjected to drying and calendering, whereby a diazo-type thermosensitive recording material No. 2 was prepared.

The image density and fading of the images recorded on the diazo-type thermosensitive recording material No. 2 were measured in the same manner as in Example 1.

The result was that the image density was 1.15 and the image density after the exposure to the light of the fade meter was 1.07.

EXAMPLE 3

(1) Preparation of Coupler Dispersion C-2

| | Parts by Weight |
|---|---|
| 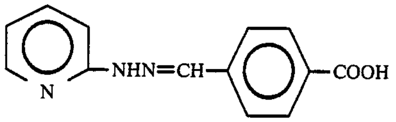 | 5 |
| Sodium trichloroacetate | 6 |
| Benzimidazole | 5 |
| Tartaric acid | 1 |
| Nickel chloride | 15 |
| Ethylenebis stearamide | 7 |
| Isobutylene - maleic anhydride copolymer (20% aqueous solution) | 10 |
| Water | 51 |

The above components were dispersed in a ball mill for 24 hours, whereby Coupler Dispersion C-2 was prepared.

(2) Preparation of Diazonium Compound Dispersion D-2

| | Parts by Weight |
|---|---|
| 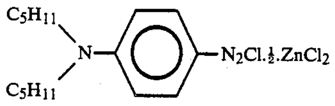 | 2 |
| Paraffin wax | 4 |
| Methylurea | 2 |
| Polyvinyl cinnamate | 2 |
| Toluene | 90 |

The above components were dispersed in a ball mill for 24 hours, whereby Diazonium Compound Dispersion D-2 was prepared.

The Coupler Dispersion C-2 was applied to a sheet of high quality paper (having a basis weight of 50 $g/m^2$) so as to form a coupler layer with a deposition of 1.5 to 2.0 $g/m^2$ of the solid components thereof when dried.

After the coupler layer was dried, Diazonium Coumpound Dispersion D-2 was applied to the coupler layer so as to form a diazonium compound layer with a deposition of 1.5 to 2.0 $g/m^2$ of the solid compounds thereof (when dried), and was then dried, whereby a diazo-type thermosensitive recording material was prepared, which was then subjected to drying and calendering, so that a diazo-type thermosensitive recording material No. 3 according to the present invention was prepared.

The image density and fading of the images recorded on the diazo-type thermosensitive recording material No. 3 were measured in the same manner as in Example 1.

The result was that the image density was 1.13 and the image density after the exposure to the light of the fade meter was 1.09.

EXAMPLE 4

Preparation of Thermosensitive Coloring Layer Formation Liquid No. 2

| | Parts by Weight |
|---|---|
| 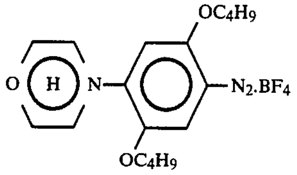 | 2 |
| 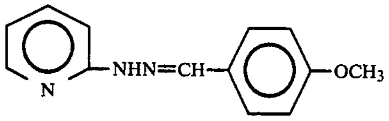 | 3 |
| Nickel chloride | 3 |
| Stearamide | 15 |
| Guanidine phosphate | 6 |
| Gluconic acid | 1 |
| Calcium carbonate | 3 |
| Cyclohexane | 48 |

Thermosensitive Coloring Layer Formation Liquid No. 2 was prepared by dispersing the above components in a ball mill for 12 hours, adding thereto 8 parts by weight of polyvinyl cinnamate, followed by mixing the mixture until it was uniformly mixed.

The thus prepared thermosensitive coloring layer formation liquid was applied to a sheet of high quality paper (having a basis weight of 50 $g/m^2$), so that a thermosensitive coloring layer was formed on the paper with a deposition of 1.5 to 2.0 $g/m^2$ of the solid components when dried.

The thus prepared thermosensitive recording material was dried and was subjected to calendering, whereby a diazo-type thermosensitive recording material No. 4 according to the present invention was prepared.

The image density and fading of the images recorded on the diazo-type thermosensitive recording material No. 4 were measured in the same manner as in Example 1.

The result was that the image density was 1.08 and the image density after the exposure to light by the fade meter was 1.00.

EXAMPLE 5

(1) Diazonium Compound Dispersion D-1 was prepared in the same manner as in Example 2.

(2) Preparation of Coupler Dispersion C-3

| | Parts by Weight |
|---|---|
| 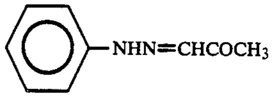 | 5 |
| Montan wax | 2 |
| Kaolin | 2 |
| Zinc chloride | 15 |
| Polyvinyl cinnamate | 2 |
| n-hexane | 74 |

The above components were dispersed in a ball mill for 24 hours, whereby Coupler Dispersion C-3 was prepared.

Diazonium Compound Dispersion D-1 was applied to a sheet of high quality paper (having a basis weight of 50 g/$m^2$) so as to form a diazonium compound layer with a deposition of 1.5 to 2.0 g/$m^2$ of the solid components thereof when dried.

After the diazonium compound layer was dried, Coupler Dispersion C-3 was applied to the diazonium compound layer so as to form a coupler layer with a deposition of 1.5 to 2.0 g/$m^2$ of the solid compounds thereof (when dried), and was then dried, whereby a diazo-type thermosensitive recording material was prepared. The recording material was then subjected to drying and calendering, whereby a diazo-type thermosensitive recording material No. 5 was prepared.

The image density and fading of the images recorded on the diazo-type thermosensitive recording material No. 5 were measured in the same manner as in Example 1.

The result was that the image density was 1.16 and the image density after the exposure to light by the fade meter was 1.09.

EXAMPLE 6

(1) Preparation of Coupler Dispersion C-4

| | Parts by Weight |
|---|---|
| 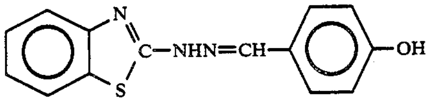 | 5 |
| Sodium trichloroacetate | 6 |
| Benzimidazole | 5 |
| Tartaric acid | 1 |
| Nickel chloride | 15 |
| Ethylenebis stearamide | 7 |
| Isobutylene-maleic anhydride copolymer (20% aqueous solution) | 10 |
| Water | 51 |

The above components were dispersed in a ball mill for 24 hours, whereby Coupler Dispersion C-4 was prepared.

(2) Diazonium Compound Dispersion D-2 was prepared in the same manner as in Example 3.

Coupler Dispersion C-4 was applied to a sheet of high quality paper (having a basis weight of 50 g/$m^2$) so as to form a coupler layer with a deposition of 1.5 to 2.0 g/$m^2$ of the solid components thereof when dried.

After the coupler layer was dried, the Diazonium Compound Dispersion D-2 was applied to the coupler layer so as to form a diazonium compound layer with a deposition of 1.5 to 2.0 g/$m^2$ of the solid compounds thereof (when dried), and was then dried, whereby a diazo-type thermosensitive recording material was prepared, which was then subjected to drying and calendering, so that a diazo-type thermosensitive recording material No. 6 according to the present invention was prepared.

The image density and fading of the images recorded on the diazo-type thermosensitive recording material No. 6 were measured in the same manner as in Example 1.

The result was that the image density was 1.15 and the image density after the exposure to light by the fade meter was 1.10.

COMPARATIVE EXAMPLE 1

Preparation of Comparative Thermosensitive Coloring Layer Formation Liquid

| | Parts by Weight |
|---|---|
| 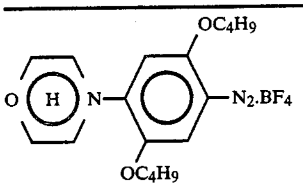 | 2 |
| 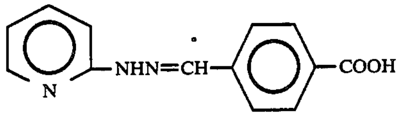 | 3 |
| Stearamide | 15 |
| Guanidine phosphate | 6 |
| Gluconic acid | 1 |
| Calcium carbonate | 3 |
| Cyclohexane | 48 |

The above components were dispersed in a ball mill for 24 hours, whereby Comparative Thermosensitive Coloring Layer Formation Liquid was prepared. The liquid was applied to a sheet of high quality paper (having a basis weight of 50 g/$m^2$), so that a thermosensitive coloring layer was formed on the paper, a deposition of 1.5 to 2.0 g/$m^2$ of the solid components when dried.

The thus prepared thermosensitive recording material was dried and was subjected to calendering, whereby a comparative diazo-type thermosensitive recording material No. 1 was prepared.

The image density and fading of the images recorded on the comparative diazo-type thermosensitive recording material No. 1 were measured.

The image density and fading of the iamges recorded on the comparative diazo-type thermosensitive recording material No. 1 were measured in the same manner as in Example 1.

The result was that the image density was 1.08 and the image density after the exposure to the light of the fade meter was 0.80.

COMPARATIVE EXAMPLE 2

(1) Diazonium Compound Dispersion D-1 was prepared in the same manner as in Example 2.

(2) Preparation of Comparative Coupler Dispersion CC-1

| | Parts by Weight |
|---|---|
| 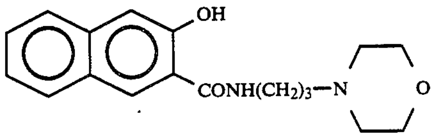 | 5 |

-continued

| | Parts by Weight |
|---|---|
| Montan wax | 2 |
| Kaolin | 2 |
| Zinc chloride | 15 |
| Polyvinyl cinnamate | 2 |
| n-hexane | 74 |

The above components were dispersed in a ball mill for 24 hours, where Comparative Coupler Dispersion CC-1 was prepared.

Diazonium Compound Dispersion D-1 was applied to a sheet of high quality paper (having a basis weight of 50 g/$m^2$) so as to form a diazonium compound layer with a deposition of 1.5 to 2.0 g/$m^2$ of the solid components thereof when dried.

After the diazonium compound layer was dried, the Comparative Coupler Dispersion CC-1 was applied to the diazonium compound layer to form a coupler layer with a deposition of 1.5 to 2.0 g/$m^2$ of the solid compounds thereof (when dried), and was then dried, whereby a diazo-type thermosensitive recording material was prepared. The recording material was then subjected to drying and calendering, whereby a comparative diazo-type thermosensitive recording material No. 2 was prepared.

The image density and fading of the images recorded on the comparative diazo-type thermosensitive recording material No. 2 were measured in the same manner as in Example 1.

The result was that the image density was 1.16 and the image density after the exposure to light by the fade meter was 0.85.

COMPARATIVE EXAMPLE 3

(1) Preparation of Comparative Coupler Dispersion CC-2

| | Parts by Weight |
|---|---|
| 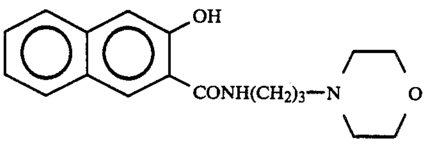 | 5 |
| Sodium trichloroacetate | 6 |
| Benzimidazole | 5 |
| Tartaric acid | 1 |
| Nickel chloride | 15 |
| Ethylenebis stearamide | 7 |
| Isobutylene-maleic anhydride copolymer (20% aqueous solution) | 10 |
| Water | 51 |

The above components were dispersed in a ball mill for 24 hours, whereby Comparative Coupler Dispersion CC-2 was prepared.

Comparative Coupler Dispersion C-2 was applied to a sheet of high quality paper (having a basis weight of 50 g/$m^2$) so as to form a coupler layer with a deposition of 1.5 to 2.0 g/$m^2$ of the solid components thereof.

(2) Diazonium Compound Dispersion D-2 was prepared in the same manner as in Examplè 3.

After the coupler layer was dried, Diazonium Compound Dispersion D-2 was applied to the coupler layer to form a diazonium compound layer with a deposition of 1.5 to 2.0 g/$m^2$ of the solid compounds thereof, and was then dried, whereby a comparative diazo-type thermosensitive recording material was prepared, which was then subjected to drying and calendering, so that a comparative diazo-type thermosensitive recording material No. 3 was prepared.

The image density and fading of the images recorded on the diazo-type thermosensitive recording material No. 3 were measured in the same manner as in Example 1.

The result was that the image density was 1.13 and the image density after the exposure to light by the fade meter was 0.78.

Table 1 shows the structure of the thermosensitive coloring layer of each example of the diazo-type thermosensitive recording materials according to the present invention and the comparative examples.

TABLE 1

| | Coated Layer(s) Thermosensitive Coloring Layer | |
|---|---|---|
| Examples | 1st Layer | 2nd Layer |
| Example | | |
| 1 | Thermosensitive Coloring Layer No. 1 | |
| 2 | D-1 | C-1 |
| 3 | C-2 | D-2 |
| 4 | Thermosensitive Coloring Layer No. 2 | |
| 5 | D-1 | C-3 |
| 6 | C-4 | D-2 |
| Comparative Example | | |
| 1 | Comparative Thermosensitive Coloring Layer | |
| 2 | D-1 | CC-1 |
| 3 | CC-2 | D-2 |

Table 2 shows a summary of the image densities obtained by the examples according to the present invention and by the comparative examples, and the corresponding image densities after fading tests by use of the fade meter.

TABLE 2

| | Image Density | Image Density after Fading Test |
|---|---|---|
| Example | | |
| 1 | 1.09 | 1.00 |
| 2 | 1.15 | 1.07 |
| 3 | 1.13 | 1.09 |
| 4 | 1.08 | 1.00 |
| 5 | 1.16 | 1.09 |
| 6 | 1.15 | 1.10 |
| Comparative Example | | |
| 1 | 1.08 | 0.08 |
| 2 | 1.16 | 0.85 |
| 3 | 1.13 | 0.78 |

The above results indicate that the diazo-type thermosensitive recording materials according to the present invention are significantly improved with respect to the fading resistance and are capable of maintaining the integrity of the recording images. Therefore, thay can be used with high reliability for various thermosensitive recordings, in particular, as the materials for output recording sheets for use with computers and facsimile apparatus, which require high speed recording capability.

In addition to the above, according to the present invention, the recorded images can be fixed by exposing the image-bearing recording material to light and decomposing the unreacted diazonium compound, so that the integrity of the recorded images can be sufficiently maintained for use as securities, merchandise coupons, entrance tickets, certificates, payment slips and the like. The colors of the images developed by the thermosensitive recording materials according to the present invention and by the comparative thermosensitive recording materials were blue or bluish violet.

What is claimed is:

1. A diazo-type thermosensitive recording material comprising a support material and a thermosensitive coloring layer formed on said support material, said thermosensitive coloring layer comprising a diazonium compound, a coupler combination and a thermo-fusible or thermo-softening material, said coupler combination being a combination of a hydrazone-type coupler selected from the group consisting of compounds of the formulae (I) to (V) and two-valence metal compound capable of chelating with a coupled product produced by the coupling of said diazonium compound and said hydrazone-type coupler, $R^1—NH—N=CH—R^2$ (I)

(II)

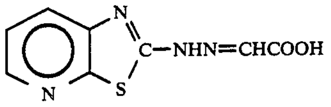

(III)

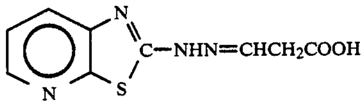

(IV)

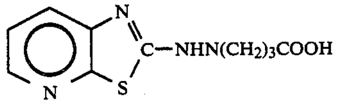

(V)

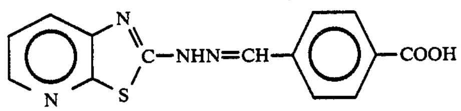

wherein $R^1$ represents 2-pyridyl, phenyl or 2-benzothiazolyl, and $R^2$ represents (1) —$COOR^3$, wherein $R^3$ represents hydrogen or lower alkyl having 1 to 6 carbon atoms, (2) —$R^4$—$COOR^5$, where $R^4$ represents lower alkylene having 1 to 5 carbon atoms, and $R^5$ represents hydrogen or lower alkyl having 1 to 6 carbon atoms, (3) 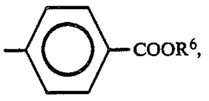

wherein $R^6$ represents hydrogen or lower alkyl having 1 to 6 carbon atoms, (4) 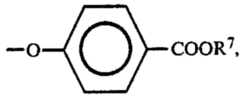

wherein $R^7$ represents hydrogen or lower alkyl having 1 to 6 carbon atoms, (5) 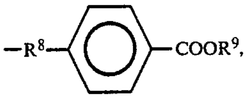

wherein $R^8$ represents lower alkylene having 1 to 6 carbon atoms, and $R^9$ represents hydrogen or lower alkyl having 1 to 6 carbon atoms, (6) 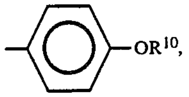

wherein $R^{10}$ represents hydrogen or lower alkyl having 1 to 6 carbon atoms, (7) 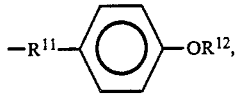

wherein $R^{11}$ represents lower alkylene having 1 to 5 carbon atoms, and $R^{12}$ represents hydrogen or lower alkyl having 1 to 6 carbon atoms, (8) —$COR^{13}$, wherein $R^{13}$ represents lower alkyl having 1 to 6 carbon atoms or phenyl, and (9) —$OR^{14}$, wherein $R^{14}$ represents hydrogn, lower alkyl having 1 to 6 carbon atoms, or phenyl,

(10) —$R^{15}$—O—$R^{16}$, wherein $R^{15}$ represents lower alkylene having 1 to 6 carbon atoms, and $R^{16}$ represents hydrogen, lower alkyl having 1 to 6 carbon atoms, or phenyl said coupled product being a formazan dye and the diazonium compound and the coupler combination being present in the coloring layer in amounts and relationship to produce a chelated formazan dye when subjected to image forming thermal exposure.

2. A diazo-type thermosensitive recording material as claimed in claim 1, wherein said hydrazone-type coupler is selected from the group consisting of:

(1)

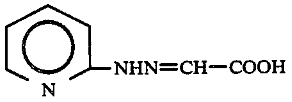

(2)

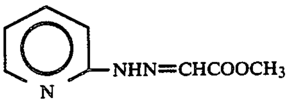

(3)

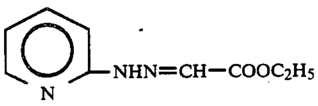

-continued
(4)
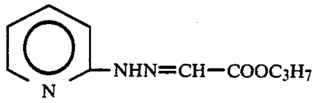
(5)
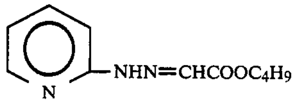
(6)
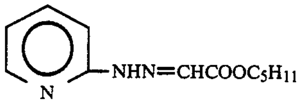
(7)
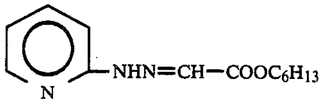
(8)
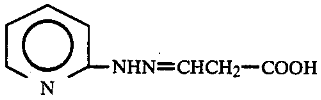
(9)
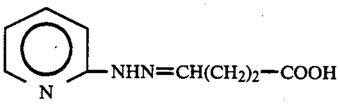
(10)
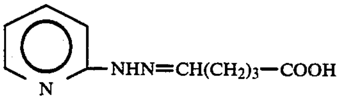
(11)
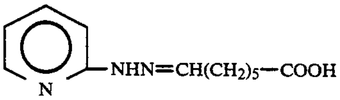
(12)
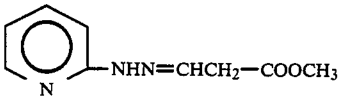
(13)
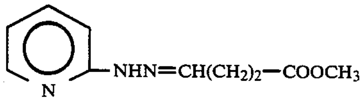
(14)
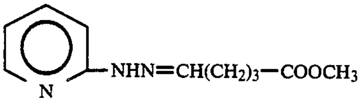
(15)
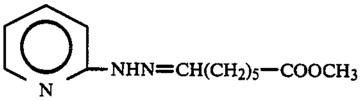
(16)
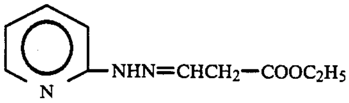
-continued
(17)
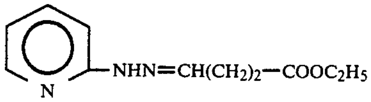
(18)
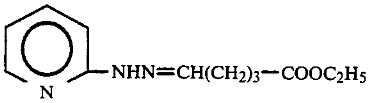
(19)
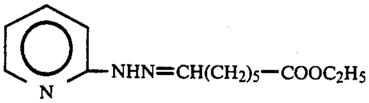
(20)
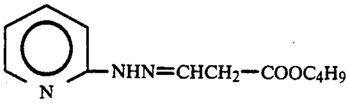
(21)
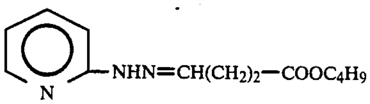
(22)
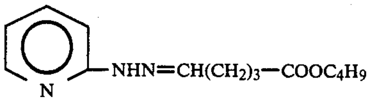
(23)
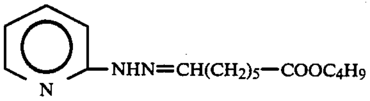
(24)
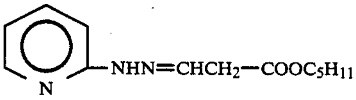
(25)
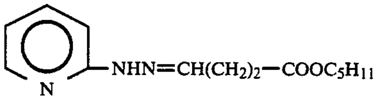
(26)
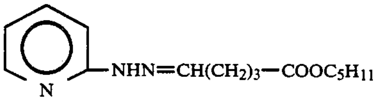
(27)
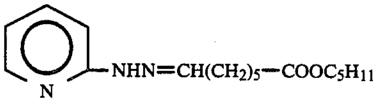
(28)
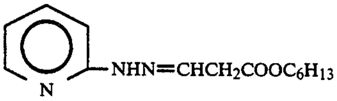
(29)
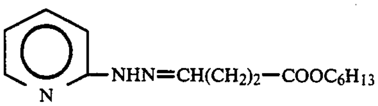

-continued
(30)
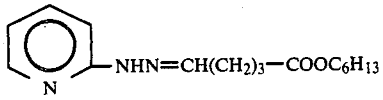
(31)
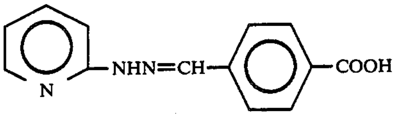
(32)
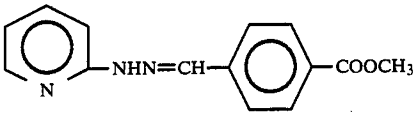
(33)
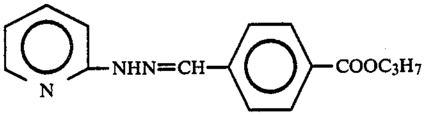
(34)
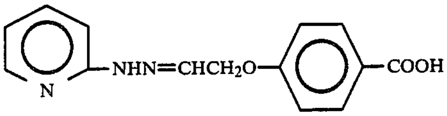
(35)
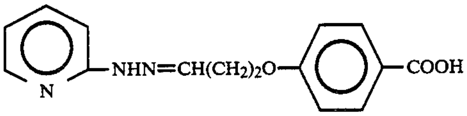
(36)
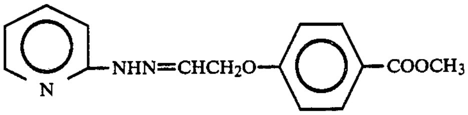
(37)
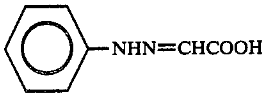
(38)
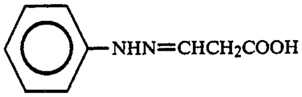
(39)
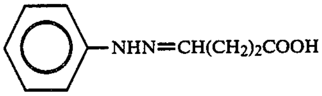
(40)
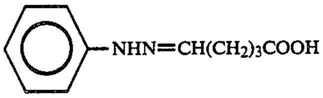
(41)
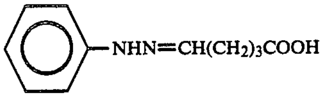
(42)
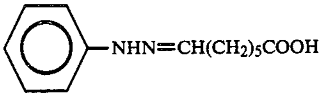
-continued
(43)
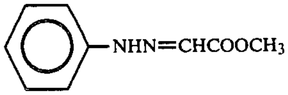
(44)
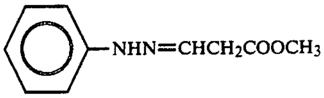
(45)
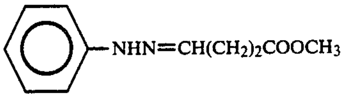
(46)
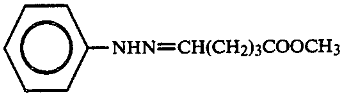
(47)
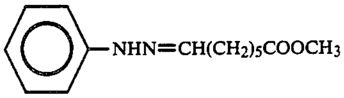
(48)
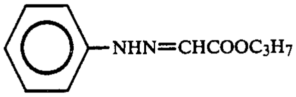
(49)
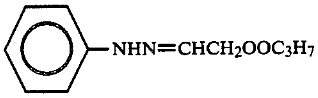
(50)
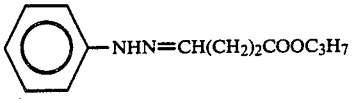
(51)
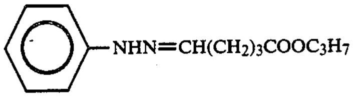
(52)
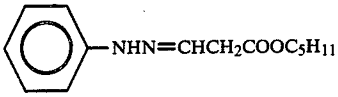
(53)
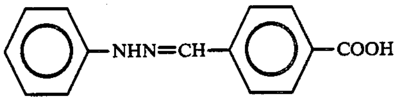
(54)
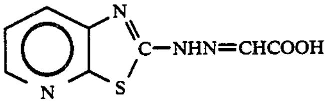
(55)
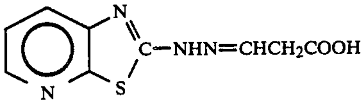

-continued
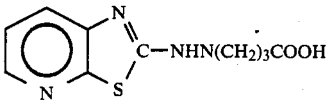
(56)
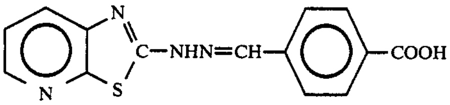
(57)
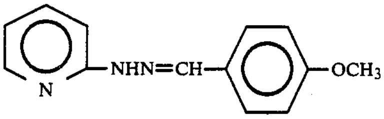
(58)
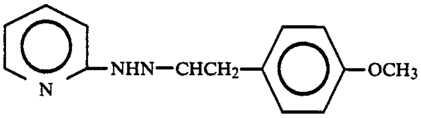
(59)
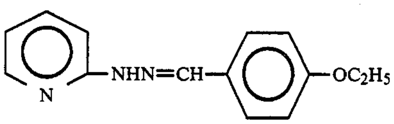
(60)
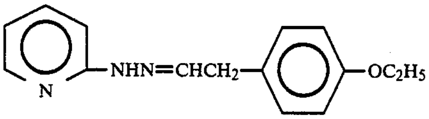
(61)
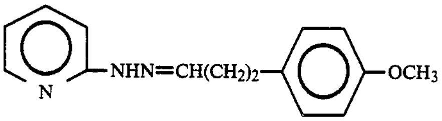
(62)
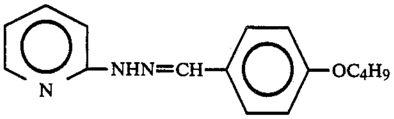
(63)
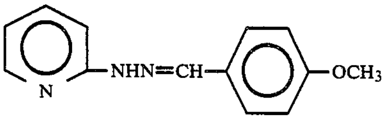
(64)
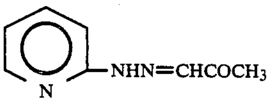
(65)
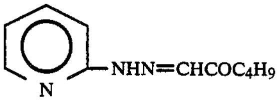
(66)
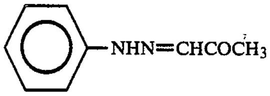
(67)
-continued
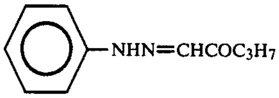
(68)
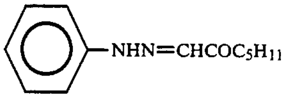
(69)
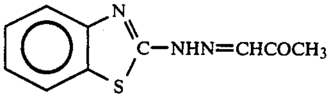
(70)
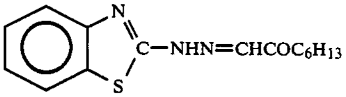
(71)
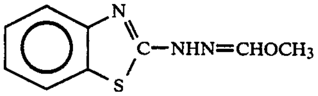
(72)
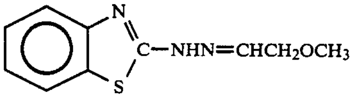
(73)
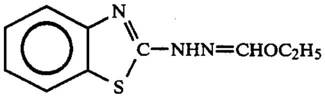
(74)
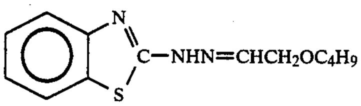
(75)
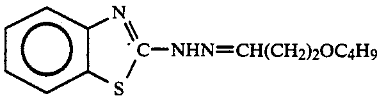
(76)
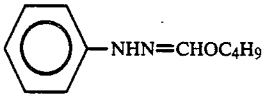
(77)
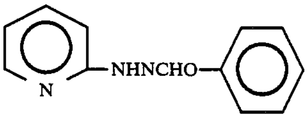
(78)
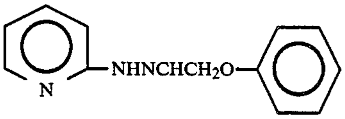
(79)
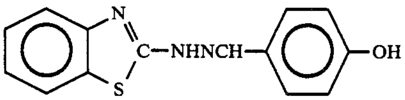
(80)

-continued (81)

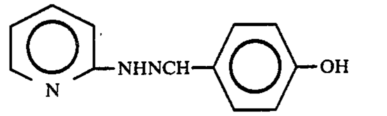

3. A diazo-type thermosensitive recording material as claimed in claim 1, wherein said two-valence metal compound is a transition metal compound.

4. A diazo-type thermosensitive recording material as claimed in claim 1, wherein said two-valence metal compound is selected from the group consisting of nickel benzenesulfonate, nickel acetate ($4H_2O$), nickel (II) acetoacetate, ammonium nickel chloride, ammonium nickel sulfate, nickel benzoate, nickel bromide, nickel carbonate (basic), nickel chloride, nickel citrate, nickel (II) 4-cyclohexylbutyrate, nickel hypophosphite, nickel formate, nickel hydroxide, nickelous iodide, nickel nitrate, nickelocene, nickel oleate, nickel oxalate, nickel phosphate, nickel phthalocyanine, potassium tricyanoniccolate, potassium nickel sulfate, nickel selenate ($6H_2O$), nickel stearate, nickel sulfamate, nickel sulfate ($7H_2O$), nickel sulfate ($6H_2O$), nickel tartrate and nickel thiocyanate.

5. A diazo-type thermosensitive recording material as claimed in claim 1, wherein the amount of said two-valence metal compound is in the range of from 0.5 moles to 10 moles with respect to 1 mole of said coupled product.

6. A diazo-type thermosensitive recording material as claimed in claim 1, wherein said diazonium compound is selected from the group consisting of the diazonium compounds having the formula of:

[I]

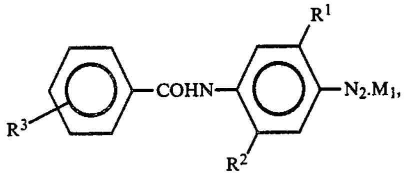

[II]

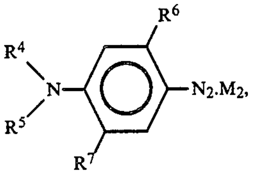

or

[III]

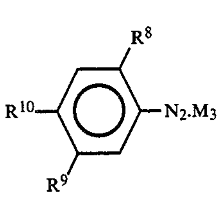

wherein $R^1$, $R^6$ and $R^8$ each represent hydrogen, halogen, lower alkyl or alkoxy having 1 to 5 carbon atoms,

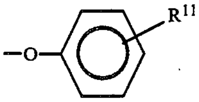

or

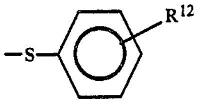

(wherein $R^{11}$ and $R^{12}$ each are the same as $R^2$); $R^2$, $R^3$ and $R^9$ each represent hydrogen, halogen, lower alkyl or alkoxy having 1 to 5 carbon atoms; $R^4$ and $R^5$ each represent lower alkyl having 1 to 5 carbon atoms, hydroxy alkyl or

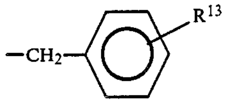

(wherein $R^{13}$ represents hydrogen, alkyl having 1 to 3 carbon atoms, or halogen); $R^7$ represents hydrogen, halogen, trifluoromethyl, alkyl or alkoxy having 1 to 5 carbon atoms, or

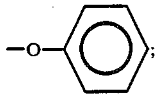

;

and $R^{10}$ represents

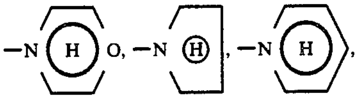

,

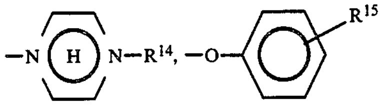

or

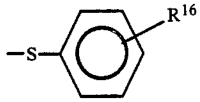

(wherein $R^{14}$, $R^{15}$ and $R^{16}$ each are the same as $R^{13}$); and $M^1$, $M^2$ and $M^3$ each represent an acid residue or an acid residue which forms a double salt in combination with a metal salt.

7. A diazo-type thermosensitive recording material as claimed in claim 1, wherein said thermo-fusible or thermo-softening material has a melting or softening point ranging from 50° C. to 250° C.

8. A diazo-type thermosensitive recording material as claimed in claim 1, wherein the amount of said thermo-fusible or thermo-softening material is in the range of 2 to 30 parts by weight to 1 part by weight of said diazonium compound.

9. A diazo-type thermosensitive recording material as claimed in claim 1, wherein said thermo-fusible or thermo-softening material is selected from the group consisting of 2,2,2-tribromoethanol, 2,2-dimethyl-trimethylene glycol, cyclohexane-1,2-diol, malonic acid, glutaric acid, maleic acid, methylmaleic acid, bees wax, shellac wax, carnauba wax, montan wax, paraffin wax, microcrystalline wax, polyhydric alcohol esters of higher fatty acids, higher fatty amines, higher fatty amides, condensates of fatty acids and amines, condensates of aromatic acids and amines, synthetic paraffins, chlorinated paraffin, higher straight-chain glycols, dialkyl-3,4-epoxyhexahydrophthalate, polyvinyl acetate, polyvinyl chloride, vinyl chloride-vinyl acetate copolymer, polyacrylic acid ester, polystyrene, polybutadiene, polyacrylamide, and styrene/butadiene/acryl type copolymer.

10. A diazo-type thermosensitive recording material as claimed in claim 1, wherein said thermosensitive coloring layer comprises a plurality of layers, and said diazonium compound and said coupler are contained in different layers.

* * * * *